May 15, 1951     H. C. HAGEDORN     2,553,259
PROCESS OF JOINING PLASTIC SUBSTANCES
Filed Sept. 2, 1947
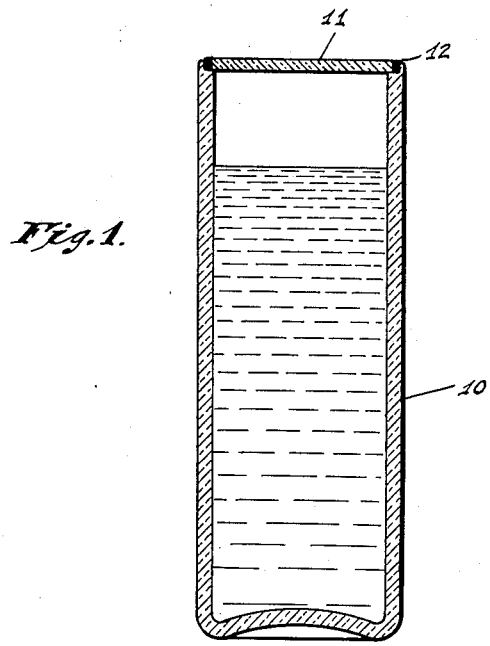
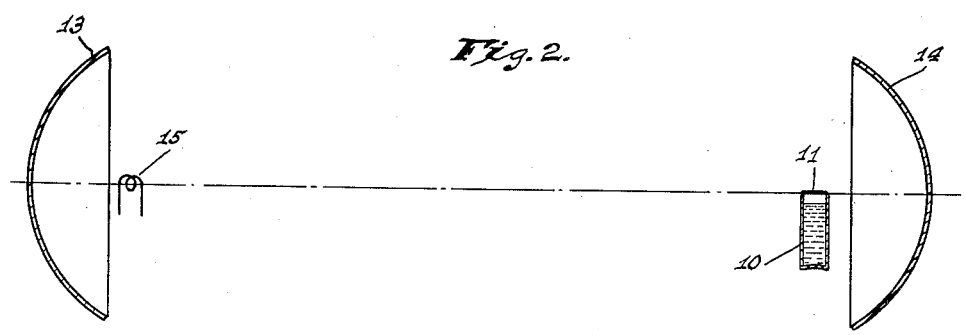
INVENTOR.
HANS CHRISTIAN HAGEDORN,
BY
ATTORNEYS.

Patented May 15, 1951

2,553,259

UNITED STATES PATENT OFFICE 2,553,259

PROCESS OF JOINING PLASTIC SUBSTANCES

Hans Christian Hagedorn, Gentofte, Denmark, assignor to Nordisk Insulinlaboratorium, Gentofte, Denmark, a corporation of Denmark Application September 2, 1947, Serial No. 771,667
In Denmark September 2, 1946

4 Claims. (Cl. 154—126)

This invention relates to the joining of articles formed of plastics, more especially thermoplastics.

It is an object of my invention to provide a process by which articles formed of plastics may be united or joined together with an effective bond and without any objectionable distortion. More specifically, it is my object to provide an effective process of fusing an article of thermoplastic material to another plastic article or to soften a piece of thermoplastic material to a point where it will adhere to and unite two or more plastic articles. It is my especial object to localize the heat action in the regions where softening or fusing of the thermoplastic material is desired, whereby to avoid distortion resulting from softening of other portions of thermoplastic material. My invention is especially useful in the sealing of containers, and more particularly in the sealing of containers for injection medicines.

In carrying out my invention, I employ visible or invisible light ray or rays of generally similar character, and I employ as the thermoplastic material which is to be softened or fused to effect the desired joint a thermoplastic which is more opaque to the rays used than is at least one of the other articles. In practicing the process, the articles to be joined are juxtaposed in the desired position and the rays, which may be concentrated by any convenient reflecting or refracting system, are passed through the transparent article in a direction to strike the relatively opaque thermoplastic which is to be softened or fused. If the rays are concentrated over an area less than that which is to be softened, the juxtaposed articles are moved transversely of the rays to bring all surface portions of the thermoplastic successively into the rays. The rays have less heating effect on the relatively transparent article through which they first pass; but upon striking the relatively opaque thermoplastic, they are absorbed, heat is generated, and the thermoplastic softens and fuses to form a bond. A relatively thin piece of relatively opaque thermoplastic may be employed to join or unite two other articles, one of which is relatively transparent, by placing the opaque thermoplastic between the two articles and passing the rays through the transparent article in the manner indicated.

The accompanying drawing illustrates my invention: Fig. 1 is a longitudinal section of an ampoule adapted to contain injection medicine, and Fig. 2 is an illustration, somewhat diagrammatic in character, showing one form of apparatus suitable for use in carrying out the invention.

The ampoule shown in Fig. 1 comprises a hollow cylindrical body portion 10 and a closure disk 11 adapted to seal the open upper end of the ampoule-body. In the specific structure illustrated, the upper end of the ampoule 10 is counterbored to a diameter somewhat greater than that of the closure 11; and in the intervening annular space between the wall of the counterbore and the periphery of the disk there is disposed a ring 12 of the material which is to be used to unite the disk with the ampoule-body. The material forming the ring 12 is thermoplastic in character and is materially less transparent with respect to the irradiation which is to be used than is the material of the ampoule-body 10.

The apparatus illustrated in Fig. 2 for completing the joint between the container-body 10 and the closure 11 comprises a pair of parabolic mirrors 13 and 14 and a source 15 of light or other suitable irradiation. The light-source 15 is located at the focus of the mirror 13, the mirror 14 is disposed to receive the light beam reflected from the mirror 13, and the container 10 with its closure 11 are disposed in such relation to the mirror 14 that the rays reflected from it will be concentrated at a point in the periphery of the ring 12. With the container so positioned, it is rotated slowly so that all portions of the ring 12 will pass through the focus of the mirror 14. The rays reflected from the mirror 14 pass through the relatively transparent material of the ampoule-body 10 without material absorption and hence without any substantial effect on that material. Upon striking the relatively opaque material of the ring 12, however, the rays are absorbed, heat is generated, and the thermoplastic material of the ring 12 softens or fuses to form a joint between the closure disk 11 and the ampoule-body 10.

Without the intention of limiting myself to any specific materials, I may cite transparent polystyrene as a suitable material for the ampoule-body 10 and the closure disk 11. The ring 12 may be formed of opaque polystyrene or of any other opaque thermoplastic.

It will of course be understood that the apparatus illustrated in Fig. 2 is but one of various suitable forms of apparatus capable of use in practicing my invention. If the thermoplastic material which is to be softened or fused in making the joint has a melting point sufficiently low, or if time permits, means such as the reflectors 13 and 14 for concentrating irradiation may be dispensed with. The particular form of joint illustrated in the drawing is intended merely as an example, as the invention is not in any way limited in respect to the form of the articles which are to be joined. Neither is it essential that the thermoplastic which is softened or fused in creating the joint be a separate element interposed between two others; for the invention can be used in joining two articles one of which is thermoplastic in character and is opaque, at least in the vicinity of the joint, with respect to the irradiation employed, while the other is transparent with respect to such irradiation. In most instances the irradiation employed may be visible light, the thermoplastic dark in color if not completely black, and the article through which the light passes clear and transparent.

The articles joined (or the transparent article to be joined to an opaque thermoplastic article, where only such two articles are involved) may or may not themselves be thermoplastic. Where any such article is thermoplastic, its surface portions adjacent the joint may be softened slightly by heat transmitted from the opaque thermoplastic material, and such slight softening may aid in producing an effective joint. However, the source of heat will be the opaque thermoplastic, which will always be hotter than the transparent material; and it is therefore possible to confine any softening of the transparent material to the region immediately adjacent the joint.

Where the opaque thermoplastic is used to join two other articles, it should be relatively thin; because the heat will largely be generated at the opaque surface upon which the radiation impinges and can reach other portions of the thermoplastic only by conduction. This last noted fact is of advantage where only two articles, one opaque and thermoplastic and the other transparent, are involved; for in that situation softening of the thermoplastic article can be confined to surface portions immediately adjacent the joint while the remainder of the article retain sufficient rigidity to avoid distortion.

I claim as my invention:

1. The process of uniting with the aid of irradiation a first part of a thermoplastic material relatively opaque to such irradiation and a second part transparent to such irradiation, which process comprises juxtaposing the two parts and passing the irradiation through the second part on to the first article to produce softening thereof.

2. A process as set forth in claim 1 with the additional steps of concentrating the irradiation into a beam having a cross-sectional area smaller than the surface of the first part and producing relative movement of the beam and the juxtaposed parts to cause the concentrated beam to impinge upon substantially all surface portions of the first part which are to be softened.

3. The process of uniting with the aid of irradiation two articles at least one of which is relatively transparent to such irradiation, which process consists in juxtaposing the two articles with an interposed member of a thermoplastic material relatively opaque to the irradiation and passing the irradiation through the transparent article on to the opaque member to produce softening thereof.

4. A process as set forth in claim 1 with the addition that the irradiation comprises visible light.

HANS CHRISTIAN HAGEDORN.

REFERENCES CITED

The following references are of record in the file of this patent:

UNITED STATES PATENTS

| Number | Name | Date |
| --- | --- | --- |
| 1,784,216 | Aldrich | Dec. 9, 1930 |
| 2,270,654 | Johnson | Jan. 20, 1942 |
| 2,296,307 | Power | Sept. 22, 1942 |
| 2,358,455 | Hallman | Sept. 19, 1944 |